UNITED STATES PATENT OFFICE.

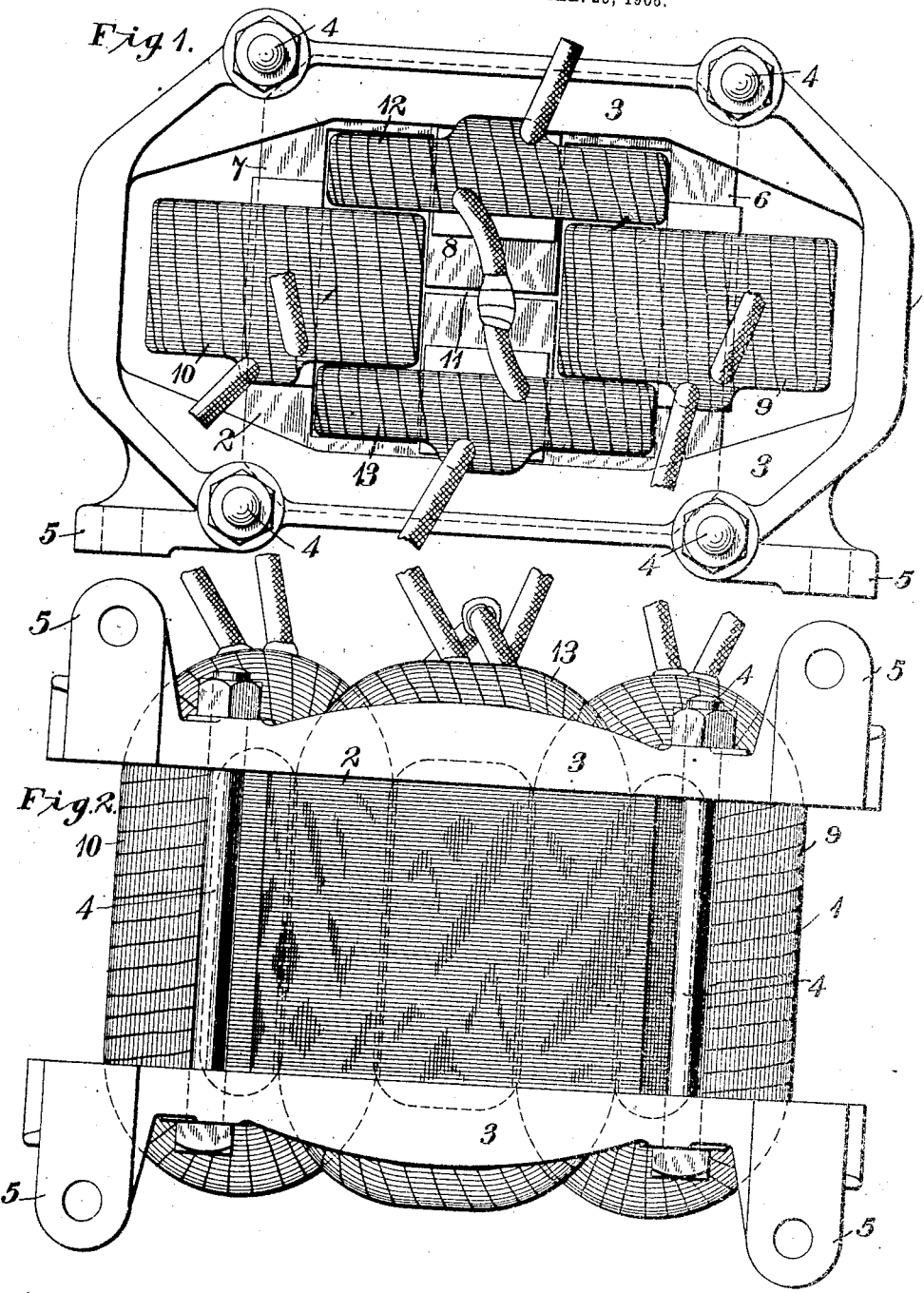

HARRY P. DAVIS, OF PITTSBURG, AND FRANK CONRAD, OF SWISSVALE, PENNSYLVANIA, ASSIGNORS TO WESTINGHOUSE ELECTRIC & MANUFACTURING COMPANY, A CORPORATION OF PENNSYLVANIA.

TRANSFORMER.

No. 841,076.      Specification of Letters Patent.      Patented Jan. 8, 1907.

Original application filed January 20, 1904, Serial No. 189,903. Divided and this application filed March 23, 1906. Serial No. 307,733.

*To all whom it may concern:*

Be it known that we, HARRY P. DAVIS, a resident of Pittsburg, and FRANK CONRAD, a resident of Swissvale, in the county of Allegheny, State of Pennsylvania, citizens of the United States, have invented a new and useful Improvement in Transformers, of which the following is a specification, this application being a division of our application Serial No. 189,903, filed January 20, 1904.

Our invention relates to electrical transformers; and it has for its object to provide a transformer comprising a core, a secondary winding, and two primary windings of such structure and arrangement that the secondary winding is active or inactive, according to the relation that exists between the circuit-conductors to which the respective primary windings are connected.

Our invention was primarily designed for use as one member or element of a protecting system for parallel transmission-lines, its function being to supply secondary current to a circuit-breaker-tripping device in case the current in either transmission-line reverses its normal direction, as is fully set forth in the hereinbefore-mentioned application, of which this application is a division; but we neither desire nor intned to limit our invention as regards either structure or service relations except in so far as limitations may be imposed by an essential operative relationship of structure and function.

In the accompanying drawings, Figure 1 is a side elevation, and Fig. 2 is a bottom or inverted plan view, of a transformer constructed in accordance with our invention.

The transformer 1 is provided with a laminated core 2, which is clamped between two end plates or frames 3 by means of bolts 4, the plates or frames being provided with feet 5 for the purpose of attaching the transformer securely to a supporting-base and holding it in proper position thereon.

The transformer-core 2 is provided with three legs 6, 7, and 8, the two outer legs 6 and 7 being provided, respectively, with primary coils 9 and 10, which are adapted for connection to separate transmission-lines. The middle leg 8 of the core is preferably of materially greater width than that of the legs 6 and 7, it being here shown as approximately double such width, and it is provided with an air-gap 11 approximately midway of its ends. The secondary winding of the transformer surrounds the leg 8, and in order that it may be symmetrically and economically disposed it may comprise two coils 12 and 13, as indicated in Fig. 1.

By reason of the location of the coils 9 and 10 upon the core 2 and the provision of the air-gap 11 in the leg 8 the magnetic fluxes produced by these coils will be entirely through the outer legs and the body portions of the core so long as the coils are connected to circuits in which the currents flow in the same direction. If the direction of the current becomes reversed in either of the coils 9 and 10, the resultant magnetic flux will be forced through the leg 8 and will induce current in the coils 12 and 13. Not only will there be no current induced in the coils 12 and 13 when the currents in the coils 9 and 10 are in the same direction, but the relative direction of the current in the coils 12 and 13 when they are subjected to the action of a resultant magnetic flux will be dependent upon which of the coils 9 and 10 receives current which is reversed from its normal direction.

It will be understood that the transformer may assume other proportions and dimensions than those here specifically shown and described, and we therefore desire to include within the scope of our invention all such variations as do not materially change the mode of operation or the result.

We claim as our invention—

1. A transformer-core having three legs, the intermediate one of which is provided with an air-gap.

2. A transformer comprising two primary windings and a secondary winding, the fluxes induced by the primary windings being normally in the same direction and the secondary winding being energized only when the directions of the fluxes induced by the two primary windings oppose each other.

3. A transformer comprising two primary windings, a secondary winding and a core having three legs, the intermediate one of which is provided with an air-gap and upon which the secondary winding is placed, the primary windings being placed, respectively, on the outer legs.

4. A transformer comprising two primary windings, a secondary winding and a core having three legs the intermediate one of which has greater reluctance than the outer two and upon which the secondary winding is placed, the primary windings being placed, respectively, on the outer legs.

5. A transformer comprising a core having three legs, the intermediate one of which is provided with an air-gap, and a winding on each leg, those on the outer legs being primary windings so connected that they normally induce fluxes in the same direction in the core, the secondary winding which is on the intermediate leg being energized only when the fluxes induced by the primary windings oppose each other.

6. A transformer having two primary windings and one secondary winding, a primary magnetic circuit of relatively low reluctance and primary magnetic circuits of high reluctance which are also the magnetic circuits for the secondary winding.

In testimony whereof we have hereunto subscribed our names this 21st day of March, 1906.

HARRY P. DAVIS.
FRANK CONRAD.

Witness as to Davis:
  CAROLINE E. SMYERS.
Witness as to both:
  BIRNEY HINES.
Witness as to Conrad:
  C. WALBORG.